T. J. Wells,
Circular Sawing Machine.
Nº 37,188.  Patented Dec. 16, 1862.
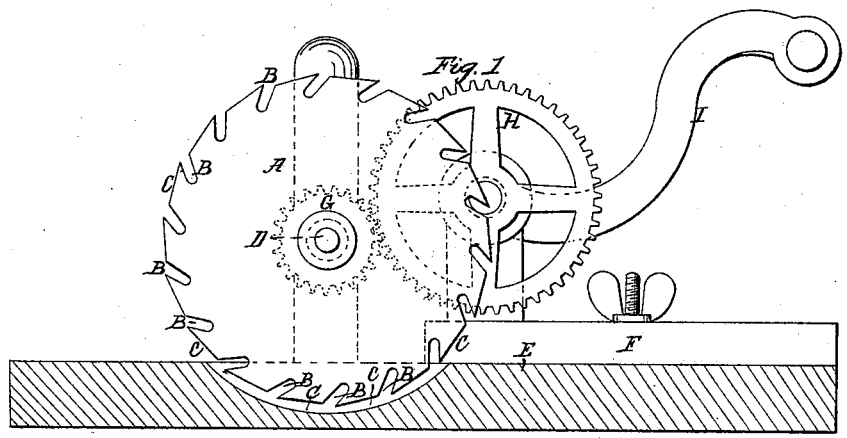
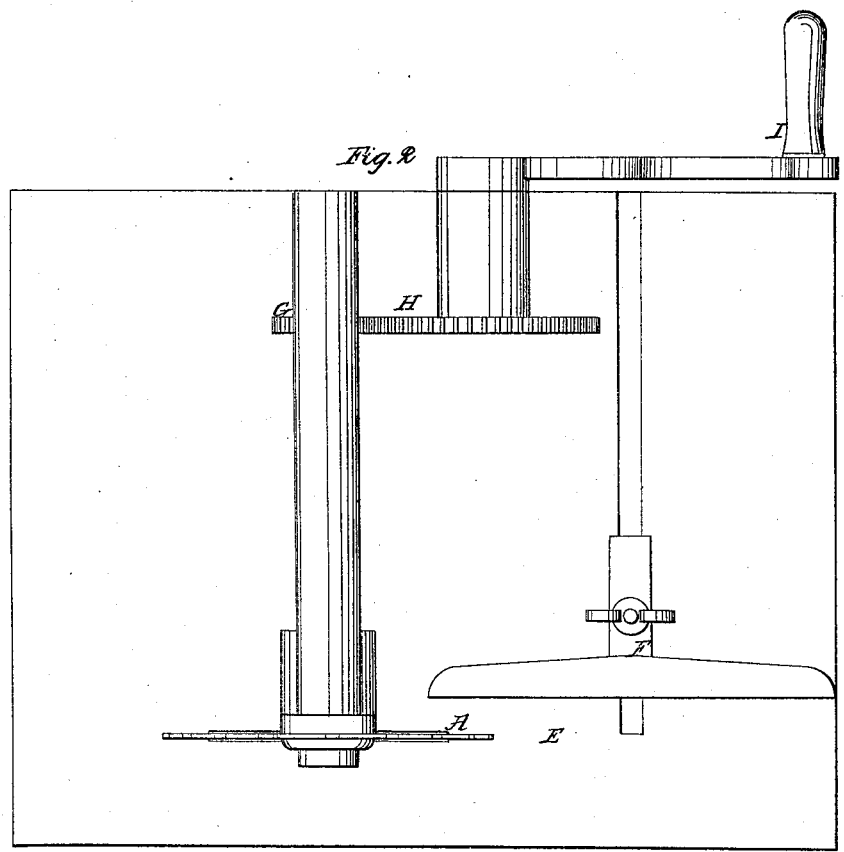
Witnesses:  Inventor:

United States Patent Office.

THOMAS J. WELLS, OF NEW YORK, N. Y.

IMPROVED SELF-FEEDING SAWING-MACHINE.

Specification forming part of Letters Patent No. 37,188, dated December 16, 1862.

*To all whom it may concern:*

Be it known that I, THOMAS J. WELLS, of the city, county, and State of New York, have invented a new and useful Self-Feeding Circular Sawing Machine; and I do hereby declare that the following is a full, clear, and exact description of the same, reference being had to the accompanying drawings, making part of this specification.

Figure 1 is a side elevation of the improved circular saw and section of the frame on which it and the necessary parts for working it are supported. Fig. 2 is a top view of the same.

Similar letters in the figures refer to corresponding parts.

This invention consists in arranging the circular saw in such relation to the table or platform on which the material is sawed, as to enable each tooth to automatically perform the double function of feeding and gaging the material being sawed to the action of the next tooth in succession, by the very act of the tooth cutting through said material at such an angle as will draw it forward the required uniform distance for the back cut of each successive tooth, thereby avoiding the necessity of forcing the material forward by hand or other means as heretofore, and enabling this form of saw, when used by hand and combined with the operating parts represented in the drawings, to be operated and saw any required length and size of stuff, by the aid of one person.

To enable others skilled in the art to make and use my invention, I will proceed to describe its construction and operation.

The forward parts of the teeth of the saw A are formed by tangential slots D in the periphery of the saw-plate, which slots extend inward at such an acute angle in relation to the backs C of the teeth as to give the required sharpness to the points or cutting-edges of the same. The backs C of the teeth are also made tangential—that is to say, they extend inward from their points or cutting-edges to their extreme rear ends, where they form obtuse angles with the forward portions of the tangential slots B, the tangential pitch of the backs of the teeth being such as to bring the rear ends of the backs such distance nearer the center of the shaft or mandrel D of the saw than the points or cutting-edges of the teeth as will correspond with the extent of cut to be made by each tooth, the back of each tooth, in fact, forming a gage for the cut of the next tooth in succession, as will be more fully described hereinafter.

The saw thus formed is secured on the end of a horizontal shaft or mandrel, D, suspended in suitable boxes in a suitable support erected from and above a horizontal table or platform, E, provided with the usual adjustable gage F, for regulating and gaging the width of cut of the material to be sawed. The relative positions of the surface of the table or platform E, over which the stuff to be cut is fed to the saw, and the shaft or mandrel D above it, are such that the points or cutting-edges of the teeth strike the material being sawed at such an angle as to draw the material forward by the very act of the teeth passing and cutting through the same, somewhat after the manner of a chisel, causing the end of the scarf thus formed to be constantly and rigidly brought up against the backs C of the teeth as they progress through the same, so that the point or cutting-edge of the teeth next in succession shall strike in their revolutions the upper surface of the material back of the scarf, the precise distance that the point or cutting-edge of the teeth project radially beyond the rear ends of their backs, thereby enabling each tooth to automatically draw the material forward the required distance for the cut of the next tooth in succession, and their backs to regulate or gage this distance.

This form and arrangement of saw is adapted to both power and hand purposes, and when employed in the latter capacity its shaft or mandrel D is suspended over a table or platform, E, properly supported, of the form represented in the drawings, as before described, which shaft or mandrel is provided with a cog-wheel, G, with which a larger cog-wheel, H, secured on a horizontal shaft provided with a hand-crank, I, gears. This hand-crank is situated in front of or at the right-hand side of the table or platform E, so that the operator can with his right hand turn the same, and with his left bring the material to be sawed properly in contact with the saw, after which it is sawed its entire length without further attendance or direction.

It will be observed from the foregoing that each tooth of the saw will cut somewhat after the manner of a chisel, and that the depth of cut of each tooth will depend upon the difference of distance between its front or cutting edge or point and the rear end of its back C radially from the center of the saw, and to accomplish this object, and to feed the material, it is not only necessary to give the peculiar tangential form to the back of the tooth represented and described, but that it is also essential that the shaft or mandrel D of the saw shall be situated the required distance above the surface of the table or platform E, over which the stuff to be sawed is fed to the saw, to cause the teeth to strike and pass through said stuff or material at the acute angle described and represented.

I do not claim the saw, as the same is an old device; but

What I do claim, and desire to secure by Letters Patent, is—

The combination of the saw A with the table E and guide F, when arranged in relation to each other, and operating in the manner and for the purpose described.

THOS. J. WELLS.

Witnesses:
E. MAHER,
GEO. W. BROWN.